Aug. 8, 1933.   J. R. DICKINSON   1,921,457
VENTILATOR FITTING

Filed Dec. 3, 1931

INVENTOR
JOSEPH R. DICKINSON
BY *Sheffield & Betts*
HIS ATTORNEYS

Patented Aug. 8, 1933

1,921,457

UNITED STATES PATENT OFFICE 1,921,457

VENTILATOR FITTING

Joseph R. Dickinson, Hampton, Va., assignor to Newport News Shipbuilding and Dry Dock Company, a Corporation of Virginia Application December 3, 1931. Serial No. 578,704

2 Claims. (Cl. 98—41)

This invention relates to fittings for ventilating devices, sometimes called ventilation louvres, for use in rooms and halls or cabins on board ships and in similar places where it is desirable that the occupants may be able to control the volume or supply of air and to a large extent to control the direction in which the flow of air that for ventilating or heating purposes may be caused to enter the enclosures.

A particular object of this invention is to provide a fitting which will conduct and diffuse the air into a desired space without producing a draught.

A further object of the invention is to provide a fitting or louvre such that the diffusion of the air into a space or enclosure will be accomplished without impinging the air on the ceiling or wall to which the louvre is attached.

Another object of the invention is to provide such a fitting that its shape will be effective to eliminate noise due to the passage of air therethrough, which often occurs when air under pressure is discharged over sharp edges of a fitting leading air to a space in which the air is used.

Figure 1:
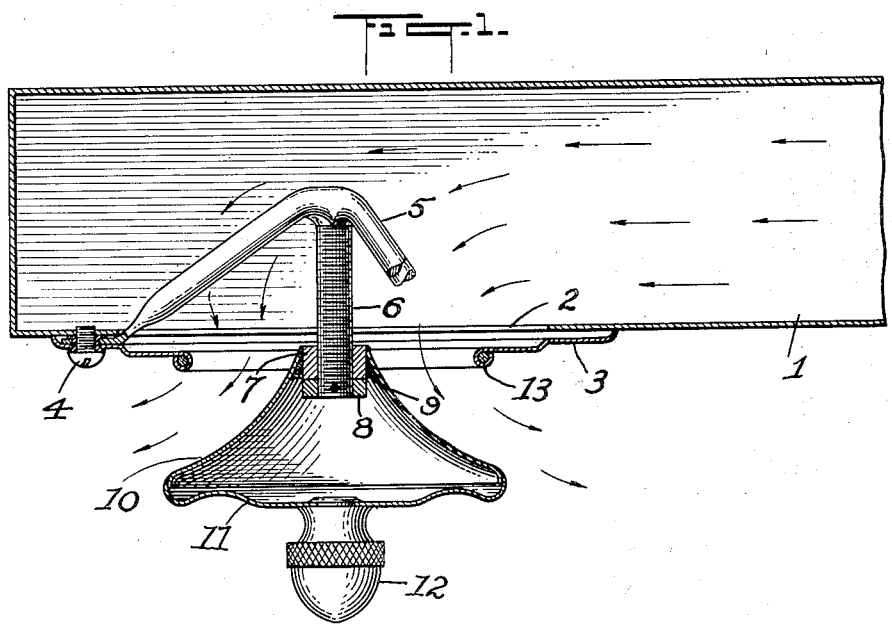
Figure 2:
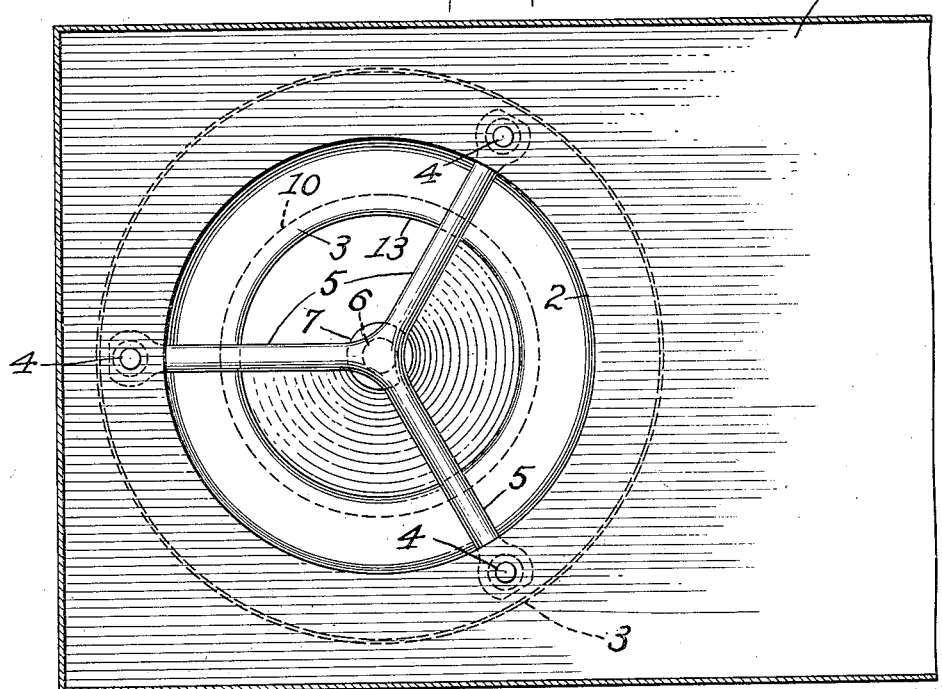

For a detailed description of this form of my invention which I at present deem preferable, reference may be had to the following specification and to the accompanying drawing forming a part thereof, in which Figure 1 is a transverse, sectional view of my improved fitting taken substantially along the axis of the louvre, and Fig. 2 is a plan view thereof, the top of the conduit in which it is placed being removed.

Referring to the drawing, the numeral 1 indicates a suitable conduit or other space to which either warm air or air at normal temperature is supplied under pressure. Said conduit is provided with an opening 2 in one wall thereof, through which the air may be discharged into the regulating or controlling portion of the fitting. This opening is provided exteriorly of the conduit 1 with a frame or annular collar 3 which is held upon the surface of the conduit 1 in any suitable way such as by having portions which are engaged by the screws 4. Said screws 4 also support a spider 5, in this instance being shown as a tripod, the converging portions of which carry a downwardly projecting screw-threaded stud 6. The screw threads of the said stud 6 are adapted to receive a rotatable nut 7 and the downward movement of this nut is limited by a fixed nut indicated at 8. The nut 7 has attached thereto by any suitable means, such as by soldering at the point 9 a frustum-shaped hollow casing 10, the base of which is furnished with a transverse plate 11 having attached thereto a projection 12, forming a handle or nut for rotating the casing 10. The plate or annular ring 3 is preferably provided with a rolled-over flange 13, which provides a curved exterior instead of a sharp edge over which the air being expelled from the conduit 1 is caused to pass.

It will be noted that the fitting proper, or the parts thereof, consists of three separate pieces— a marginal ring or annulus having a curved or rolled-over inner edge of substantial radius, a spider constituting a tripod terminating in an apex-like connecting portion from which extends a screw-threaded stud and a conical or frustum-shaped deflector, adapted to be adjusted on said stud to positions adjacent said ring, or separated therefrom, depending upon the amount of air which it is desired to allow to flow through the louvre when the parts are assembled.

Obviously, these three parts may be manufactured as a complete article of manufacture and applied to an air conduit having a substantially flat wall, after the conduit has been installed in its desired position, by the insertion of a plurality of screws or bolts, as indicated at 4 in the drawing.

In operation, it will be seen that as the air is forced through the conduit 1 as indicated by the arrows, it is expelled through the opening 2, through the central portion of the annular frame 3 and is discharged into the space below or about the adjustable casing 10. It will be noticed that this casing 10 is preferably made somewhat concave as to its conical portion so that the air is caused to travel in a curved path, particularly when the casing is placed in a higher position. This change in position may be accomplished by rotating the casing 10 by means of the projection 12, to which the operator's hand is applied. The proportions of the casing 10 which form the essential part of the louvre, are such that when the casing is in its highest position, the space between the curved flange 13 and the walls of the casing 10, will be substantially closed, thereby preventing air from escaping into the room. When this space is made annular in form by a slight lowering of the casing 10, the air will be discharged into the room axially in horizontal directions and as the louvre is still further lowered, a greater volume of air is allowed to pass and its direction of flow becomes directed downward to a greater extent.

It will be noticed that I have provided a fitting or louvre for diffusing incoming air, as well as providing means for regulating the amount of air discharged, according to whether the opening is wide open or closed or partly closed. It will also be noted that I have provided means for locking the rotating part of the louvre to prevent its being separated from the parts on which it is supported. It will also be noted that the structure of my improved ventilation louvre is such as to eliminate hissing sounds or vibrations which might otherwise occur when air under pressure is discharged over sharp edges into a space where a flow of air is desired.

Having thus described this form of my invention, what I claim and desire to protect by Letters Patent, is:—

1. As an article of manufacture, a fitting for ventilation louvres, comprising a frame adapted to be applied to an opening in the wall of an overhead air conduit, a tripod having a plurality of angularly related legs extending downward from a central apex and shaped to permit detachable connection of the outer ends thereof with said frame, a central screw-threaded stud also extending from said apex into the plane of the ends of said legs, a widely tapering deflector designed to have its smaller end carried adjustably by said stud and to contact with said frame when the said parts are assembled and said deflector is in its inmost position on said stud.

2. As an article of manufacture, a fitting for ventilation louvres, comprising an annular ring having a beaded inner edge and adapted to be applied to an overhead opening in a conduit having a substantially flat wall, a tripod having a plurality of angularly related legs extending downward from a central apex and shaped to permit detachable connection of the outer ends thereof with said ring, a central screw-threaded stud also extending from said apex into the plane of the ends of said legs, and a frustum-shaped deflector designed to have its smaller end carried adjustably by said stud and to contact with said ring when said parts are assembled and said deflector is in its inmost position on said stud.

JOSEPH R. DICKINSON.